(12) United States Patent
Sakai et al.

(10) Patent No.: US 6,686,093 B1
(45) Date of Patent: Feb. 3, 2004

(54) POSITIVE ELECTRODE ACTIVE MATERIAL FOR NONAQUEOUS ELECTROLYTIC SOLUTION SECONDARY BATTERY AND NONAQUEOUS ELECTROLYTIC SOLUTION SECONDARY BATTERY THEREWITH

(75) Inventors: Ryo Sakai, Yokohama (JP); Yasuhiro Shirakawa, Yokohama (JP); Yasumasa Ooya, Fujieda (JP); Koshin Tanaka, Shizuoka-ken (JP); Hajime Takeuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 10/009,561

(22) PCT Filed: Jun. 14, 2000

(86) PCT No.: PCT/JP00/03847

§ 371 (c)(1),
(2), (4) Date: Mar. 6, 2002

(87) PCT Pub. No.: WO00/77869

PCT Pub. Date: Dec. 21, 2000

(30) Foreign Application Priority Data

Jun. 14, 1999 (JP) ............................................. 11/167526

(51) Int. Cl.$^7$ ................................................. H01M 4/58
(52) U.S. Cl. ............................. 429/231.95; 429/218.1; 429/209; 429/231.3; 429/231.1
(58) Field of Search ........................ 429/231.95, 218.1, 429/209, 231.3, 231.1

(56) References Cited

U.S. PATENT DOCUMENTS 4,668,595 A * 5/1987 Yoshino et al. ............. 429/194

RE34,991 E    7/1995  Yoshino et al.

FOREIGN PATENT DOCUMENTS

| EP | 0 205 856 | 12/1986 |
|---|---|---|
| JP | 62-090863 | 4/1987 |
| JP | 2547992 | 5/1988 |
| JP | 63-121258 | 5/1988 |
| JP | 10-001316 | 1/1998 |
| JP | 10-241691 | 9/1998 |
| JP | 11-040140 | 2/1999 |
| JP | 11-040154 | 2/1999 |

OTHER PUBLICATIONS

International Search Report for PCT patent application No. PCT/JP00/03847, dated Aug. 31, 2000.

* cited by examiner

*Primary Examiner*—Patrick Ryan
*Assistant Examiner*—Angela J. Martin
(74) *Attorney, Agent, or Firm*—Shanks & Herbert; Mark R. Shanks

(57) ABSTRACT

A positive electrode active material for nonaqueous electrolytic solution secondary batteries is substantially made of a Li containing transition metal composite oxide, which has a composition expressed by $Li_xM_yS_zO_2$ (wherein M is a transition metal, such as Co, Ni, Mn, Fe and V, and $0.9 \leq x \leq 1.15$, $0.8 \leq y \leq 1.00$, and $0 < z < 0.001$). Such positive electrode active material is excellent in particle size controllability (miniaturization and sharpening of the particle size distribution). A nonaqueous electrolytic solution secondary battery comprises a positive electrode, a separator, a negative electrode, a battery case accommodating these, and a nonaqueous electrolytic solution filled in the battery case. The positive electrode contains the positive electrode active material for the nonaqueous electrolytic solution secondary battery expressed by the aforementioned general formula.

16 Claims, 3 Drawing Sheets

FIG. 1

FIG. 3
Z DEPENDENCE OF PARTICLE SIZE
AND LOW TEMPERATURE CHARACTERISTICS

POSITIVE ELECTRODE ACTIVE MATERIAL FOR NONAQUEOUS ELECTROLYTIC SOLUTION SECONDARY BATTERY AND NONAQUEOUS ELECTROLYTIC SOLUTION SECONDARY BATTERY THEREWITH

TECHNICAL FIELD

The present invention relates to a positive electrode active material that is made of a Li-containing transition metal composite oxide and used for a nonaqueous electrolytic secondary battery, and a nonaqueous electrolytic solution secondary battery therewith.

RELATED ART

Recently, note type personal computers, personal digital assistants (PDAS), cellular phones and soon are rapidly spreading. As they spread, there is a strong demand in that multi-functional portable electronic instruments are allowed to operate for a longer period. Accordingly, there is an ever stronger demand for smaller and higher capacity secondary batteries, which may be used as power source of various kinds of electronic equipment including portable electronic equipment.

As a secondary battery capable of satisfying such demands, there is known a Li ion secondary battery that utilizes a nonaqueous electrolytic solution including, for instance, a Li salt. In the Li-ion secondary battery, a Li containing transition metal composite oxide, such as $LiCoO_2$ and $LiNiO_2$, is used as the positive electrode active material. For a negative electrode, carbonaceous material is utilizes, and a nonaqueous electrolytic solution, in which a lithium salt, such as $LiPF_6$ or $LiBF_4$, is dissolved in a nonaqueous solvent, is utilized. Such Li ion secondary batteries are in heavy usage as a power source or the like of the portable electronic equipment.

The positive electrode active material, such as $LiCoO_2$ or $LiNiO_2$, is normally obtained by sintering a mixture of cobalt oxide or nickel oxide and lithium carbonate in air at a temperature of substantially 900° C., and thereby converting into a composite oxide. In the Li-ion secondary battery, the positive electrode active material largely affects on the battery characteristics and so on. Accordingly, in order to improve the battery characteristics and to overcome problems in manufacture of the positive electrode active material, various additives to $LiCoO_2$ or $LiNiO_2$ have been proposed.

For instance, Japanese Patent Laid-Open Application No. 62-90863 JP-A discloses an active material expressed by $A_xM_yN_zO_2$ (wherein A denotes alkali metal element, such as Li or the like, M denotes a transition metal element, such as Co, Ni and Mn, N denotes at least one kind element selected from Al, In and Sn, and $0.05 \leq x \leq 1.10, 0.85 \leq y \leq 1.00, 0.001 \leq z \leq 0.10$). In this, the battery characteristics, such as charge-discharge cycle characteristics, are improved by use of an additive, such as Al, In, or Sn.

Japanese Patent Laid-Open Application No. 63-121258 JP-A discloses a positive electrode active material thereto Sc, Mn, Ti, Rb, Sr, B, or P is further added. Furthermore, Japanese Patent Laid-Open Application No. 10-1316 JP-A discloses a positive electrode active material in which Co in $LiCoO_2$ is partially replaced by an element, such as B, Mg, Si, Cu, Ce, Y, Ti, V, Mn, Fe, Ni, Sn, or Zr.

In order to improve the rate characteristics and temperature characteristics of the lithium ion secondary battery, particle size of the positive electrode active material is preferable to be finer. In particular, in order to improve low temperature characteristics of the battery, it is considered that miniaturization of the particle size of the positive electrode active material is indispensable. The particle size of the positive electrode active material is generally controlled through the sintering temperature. Specifically, it has been tried to make the particle size finer by sintering at a temperature of substantially 800° C.

However, in the positive electrode active material, which is sintered at low temperatures, because of insufficient reaction, there is a problem in that it deteriorates charge-discharge cycle characteristics of the secondary battery. This is because $LiCoO_2$ structure grows insufficiently due to the low temperature sintering. Furthermore, the finer particle size may be obtained also by making a Li/Co ratio of the $LiCoO_2$ active material smaller. However, in this case, since, similarly as the case of the low temperature sintering, the sufficient crystallinity may not be obtained, battery capacity and charge-discharge cycle characteristics deteriorate.

Furthermore, in order to control the particle size of the positive electrode active material, it has been tried to add various kinds of elements. However, the added elements, when used as an actual secondary battery, may cause a likelihood of such as gas evolution or precipitation due to repetition of charge and discharge. As a result, pressure inside the battery rises, and, in extreme cases, there is a problem in that a pressure valve of the battery operates, and the secondary battery could be destroyed.

An object of the present invention is to provide a positive electrode active material for a nonaqueous electrolytic solution secondary battery that, while maintaining the controllability (miniaturization control) of the particle size, may allow suppressing the gas evolution or the like. Another object of the present invention is to provide, by use of such positive electrode active material, a nonaqueous electrolytic solution secondary battery that may allow improving battery characteristics, such as charge-discharge cycle characteristics and temperature characteristics, and inhibiting the pressure rise in the battery.

DISCLOSURE OF THE INVENTION

A positive electrode active material of the present invention for nonaqueous electrolytic solution secondary batteries is substantially made of a Li containing transition metal composite oxide, which has a composition expressed by, General formula: $Li_xM_ySn_zO_2$ (wherein M denotes at least one kind element selected from transition metal elements, and x, y and z denote the numbers satisfying, respectively, $0.9 \leq x \leq 1.15, 0.85 \leq y \leq 1.00,$ and $0m < z < 0.001$). In the positive electrode active material of the present invention for nonaqueous electrolytic solution secondary batteries, Co may be preferably used as at least part of the M element.

The nonaqueous electrolytic solution secondary battery of the present invention includes a positive electrode, which contains the aforementioned positive electrode active material of the present invention for nonaqueous electrolytic solution secondary batteries: a negative electrode disposed to face the positive electrode through a separator: a battery case for accommodating the positive electrode, the separator, and the negative electrode: and a nonaqueous electrolytic solution filled in the battery case.

The positive electrode active material of the present invention for nonaqueous electrolytic solution secondary batteries contains a very slight amount of Sn (in the range of $0<z<0.001$ as a z value in the general formula). Some elements have been known as the additive, which is capable of controlling so that the particle size of the positive electrode active material, such as $LiCoO_2$ and so on, may be fine. Among these, it is found that Sn, in particular, may sufficiently exhibit the effect by an only slight addition.

That is, the present positive electrode active material containing a very slight amount of Sn may allow making the particle size finer by sintering under ordinary conditions. Furthermore, a more sharp particle size distribution may be obtained. Thereby, the battery characteristics, such as charge-discharge cycle characteristics and temperature characteristics may be improved.

In addition to the above, since the Sn, which exhibits the aforementioned effect, is contained by an only very slight amount, the pressure inside the battery may be suppressed from rising. Mechanism of gas evolution when the Sn is present is not sufficiently elucidated. However, gasification of the electrolytic solution due to a catalytic action of the Sn may be considered. In the present invention, since the Sn is only slightly added, the catalytic action of the Sn may be suppressed, thereby the gasification of the electrolytic solution may be inhibited from occurring.

EMBODIMENTS

In the following, implementation modes for the present invention will be explained.

Figure 1:
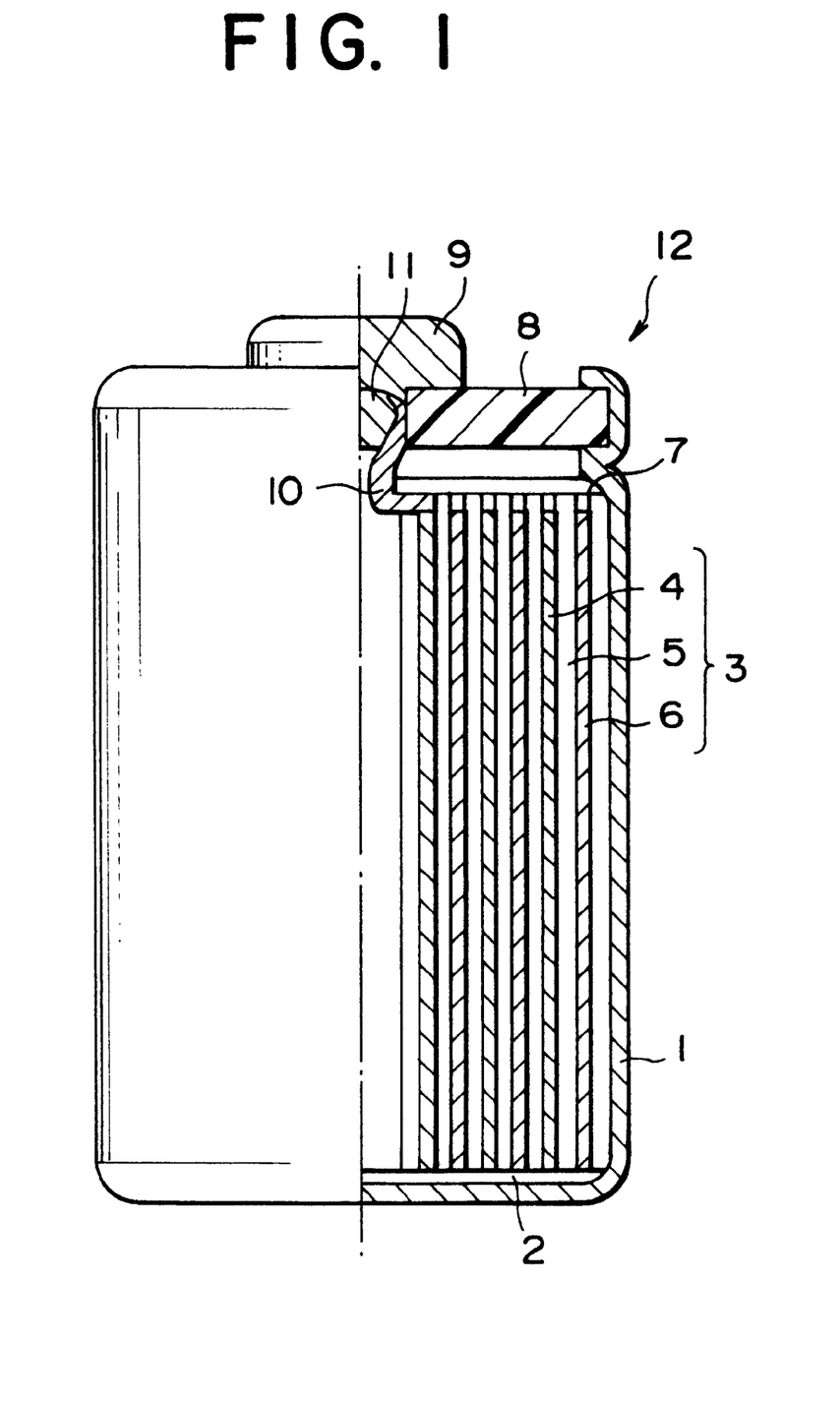
FIG. 1 is a diagram showing a structure of one embodiment, in which a nonaqueous electrolytic solution secondary battery of the present invention is applied in a Li ion secondary battery, by a partial sectional view.

FIG. 1 is a diagram showing a structure of one embodiment, in which a nonaqueous electrolytic solution secondary battery of the present invention is applied in a Li ion secondary battery, by a partial sectional view. In this drawing, reference numeral 1 denotes a battery case (battery canister), made of, for instance, stainless steel. At a bottom of the battery case 1, an insulator 2 is disposed. As a shape of the battery case 1, for instance, a cylinder with a bottom or a rectangular prism with a bottom may be applied. The present invention may be applied to either one of cylindrical secondary batteries and rectangular prism secondary batteries.

The battery case 1 concurrently works as a negative electrode terminal, and an electrode group 3 is accommodated, as a power-generating element, in such a battery case 1. The electrode group 3 has such a structure in that a belt-like body, in which a positive electrode 4, a separator 5 and a negative electrode 6 are laminated in this order, is wound, for instance, in whirlpool, so that the negative electrode 6 may be located outside. The electrode group 3 is not restricted to the whirlpool-like shape, and the positive electrode 4, the separator and the negative electrode 6 may be laminated in this order a plurality of times.

A nonaqueous electrolytic solution is accommodated in the battery case 1 where the electrode group 3 is accommodated. Insulating paper 7 with an opening in the center thereof is disposed at an upper portion of the electrode group 3 in the battery case 1. An insulating shielding plate 8 is disposed at an upper opening of the battery case 1. The insulating shielding plate 8 is liquid-tightly fixed against the battery case 1 by caulking the neighborhood of an upper end of the battery case inwards.

A positive electrode terminal 9 is engaged to the center of the insulating shielding plate 8. One end of a positive electrode lead 10 is connected through a safety valve 11 to the positive electrode terminal 9. Other end of the positive electrode lead 10 is connected to the positive electrode 4. The negative electrode 6 is connected through a negative electrode lead (not shown) to the battery case 1, a negative electrode terminal. Therefrom, a Li ion secondary battery 12 as the nonaqueous electrolytic solution secondary battery is configured.

Next, the positive electrode 4, the separator 5 and the negative electrode 6, which constitute the electrode group 3, and the nonaqueous electrolytic solution will be explained in detail.

First, the positive electrode 4 is prepared by dispersing a positive electrode active material, a conductive agent and a binder in an appropriate solvent, followed by coating on a current collector and drying, and by making in a thin plate. For the positive electrode active material, a Li containing transition metal composite oxide, substantially expressed by, General formula: $Li_xM_ySn_zO_2$ (1)

(wherein M denotes at least one kind of element selected from transition metal elements, and x, y and z, respectively, denote the numbers satisfying $0.9 \leq x \leq 1.15$, $0.85 \leq y \leq 1.00$, and $0 < z < 0.001$) may be employed.

In the Li containing transition metal composite oxide expressed by formula (1), for the M element, various kinds of transition metal elements, such as Co, Ni, Mn, Fe, and V, may be used. The miniaturization of the particle size due to a very slight amount of Sn is effectively obtained, in particular, when Co is used as at least part of the M element.

That is, the Li containing transition metal composite oxide, which constitutes the positive electrode active material, is preferable to have a composition substantially expressed by General formula: $Li_x(Co_{1-a}M'_a)_ySn_zO_2$ (2)

(wherein M' denotes at least one kind of element selected from Ni, Mn, Fe, and V, and x, y, z, and a, respectively, denote the numbers satisfying $0.9 \leq x \leq 1.15$, $0.85 \leq y \leq 1.00$, $0 < z < 0.001$, and $0 \leq a < 1$). At this time, the M element is particularly preferable to be a mixture of Co and Ni. Furthermore, for the M element, at least one kind element selected from Co and Ni may be effectively used.

Furthermore, the positive electrode active material of the present invention is desirable to be made of the Li containing transition metal composite oxide substantially expressed by General formula: $Li_xCo_ySn_zO_2$ (3)

(wherein $0.9 \leq x \leq 1.15$, $0.85 \leq y \leq 1.00$, and $0 < z < 0.001$). Such Li containing Co composite oxide is a preferable positive electrode active material also in view of the battery capacity.

In the aforementioned formulae (1) through (3), a value of x is in the range of from 0.9 to 1.15, and a value of y is in the range of from 0.85 to 1.00. When the values of x and y are outside of the aforementioned values, in either cases, sufficient battery capacity may not be obtained. An x/y ratio is preferable to be one or more. When the x/y ratio is less than one, sufficient crystallinity may not be obtained, resulting in deterioration of the charge-discharge cycle characteristics or the battery capacity. A value of a in formula (2) is in the range of $0 \leq a < 1$, it is particularly preferable for a to be in the range of from 0.1 to 0.5.

The Li containing transition metal composite oxide, which contains a very slight amount of Sn, may be able to miniaturize the particle size under the ordinary condition sintering, based on the slightly added Sn. According to the Li containing transition metal composite oxide expressed by the aforementioned formula (1), even when a mixture of a predetermined ratio of starting raw materials of individual metal elements (oxide or carbonate, for instance) is sintered, for instance, in air, at a temperature of substantially 900° C., due to the effect of Sn, a small average particle size (D(50) value), such as, for instance, 10 $\mu$m or less, may be realized. The average particle size of the Li containing transition metal composite oxide (positive electrode active material) is further preferable to be in the range of from 3 to 8 $\mu$m.

Furthermore, the Li containing transition metal composite oxide may be made sharper in its particle size distribution by adding a slight amount of Sn thereto. Specifically, a D(1) value of the Li containing transition metal composite oxide may be made 0.2 $\mu$m or more, and a D(99) value may be made 50 $\mu$m or less. The D(1) value of the Li containing transition metal composite oxide is further preferable to be 0.4 $\mu$m or more, and the D(99) value to be 0 $\mu$m or less.

According to the present invention, due to the effect of addition of Sn, the particle size distribution of the Li containing transition metal composite oxide may be made sharper. However, when ultra coarse particles, such as exceeding, for instance, 100 $\mu$m in their particle sizes, are present, clogging of a coater at the manufacture of the electrode or manufacture failure may be caused. The ultra coarse particles, such as exceeding 100 $\mu$m, do not show up, in many cases, in the particle size distribution. These ultra coarse particles are preferably removed by the operation, such as sieving or classification.

Since the clogging is easily caused in the sieving, it is preferable to apply the classification, which makes use of the difference of resistance due to the size or density of the particles. Such classification makes use of a fact that the resistance of the particle is different due to the particle size and the density, with respect to gravity, inertial force, and centrifugal force. Specifically, classifiers due to gravity method, inertial method, or centrifugal method may be used. In particular, dry type classifier may be preferably used.

The average particle size (D(50) value) in the present invention denotes a particle size at which a cumulative volume accumulated from a smaller particle size side in a particle size distribution, measured by means of a Micro Track method, reaches 50%. The D(1) is similarly a particle size when the cumulative volume of particles reaches 1%, and the D(99) is a particle size when the cumulative volume of particles reaches 99%.

Measurement of the particle size distribution is carried out in the following way. That is, the particle size distribution is measured by means of MICROTRACK II PARTICLE SIZE ANALYZER (manufactured by LEEDS & NORTHRUP INSTRUMENTS). This utilizes, as a measuring principle, an optical scattering phenomenon occurring when laser light is irradiated on particles. Since an intensity and a scattering angle of the scattered light largely depends on the particle size, the particle size distribution of particles may be obtained by measuring, by means of an optical detector, the intensity and the scattering angle of the scattered light, and by processing the data by a computer.

According to the Li containing transition metal composite oxide (positive electrode active material) of which particle size is made finer as mentioned above, the charge-discharge characteristics and the temperature characteristics of the Li ion secondary battery 12 may be improved. In particular, the low temperature characteristics of the Li ion secondary battery 12 are largely influenced by the particle size of the positive electrode active material. Accordingly, the battery capacity may be sufficiently maintained at low temperatures (−20° C., for instance) by the use of the miniaturized Li containing transition metal composite oxide. This largely contributes in an improvement of a usable time of a device.

Furthermore, since the Li containing transition metal composite oxide expressed by formula (1) contains only a slight amount of Sn, the gas evolution in the Li ion secondary battery 12 may be suppressed as low as possible. This is considered that, by suppressing the content of Sn to a very slight amount, gasification of the electrolytic solution due to the catalytic action of Sn may be suppressed from occurring.

In other words, the positive electrode active material of the present invention contains Sn in the range of capable of suppressing the gas evolution as low as possible, based on the findings that the miniaturization effect of the particle size may be attained by only a slight amount of Sn. From these situations, the content of Sn is set at less than 0.001 as the value of z in the aforementioned formula (1). When the value of z is 0.001 or more, the aforementioned catalytic action of Sn becomes active, the gasification of the nonaqueous electrolytic solution is promoted, and resulting in the pressure rise inside the battery.

By only a slight amount of Sn content, the miniaturization effect due to that may be obtained. Accordingly, the value of z in formula (1) need only satisfy 0<z. However, in order to obtain assured miniaturization effect of the particle size, the value of z is preferable to be 0.00001 or more. That is, the value of z in the formula (1) is preferable to be in the range of $0.00001 \leq z < 0.001$, in particular to be in the range of $0.0001 \leq z < 0.001$.

As a conductive material and binder, which are mixed with the aforementioned positive electrode active material to constitute a positive electrode mixture, various kinds of -15 materials, which have been used so far for the nonaqueous electrolytic solution secondary battery, may be used. For the conductive material, acetylene black, carbon black, graphite, and so on, may be used. For the binder, polytetrafluoroethylene (PTFE), polyvinylidene fluoride (PVDF), ethylene-propylene-diene copolymer (EPDM), styrene-butadiene-rubber (SBR), and so on may be used.

Compounding ratios of the positive electrode active material, the conductive material and the binder are preferable to be, respectively, in the range of from 80 to 95% by mass, from 3 to 20% by mass, and from 2 to 7% by mass. For the current collector, on which a suspension containing the positive electrode active material, the conductive material and the binder is coated, followed by drying, for instance, aluminum foils, stainless steel foils, nickel foils and so on may be used.

Also for the other battery constituent elements, such as the separator 5, the negative electrode 6, the nonaqueous electrolytic solution and so on, various kinds of materials and configurations, which have been so far used for the non-aqueous electrolytic solution secondary battery, may be applied. For instance, for the separator 5, synthetic resin nonwoven fabric, porous polyethylene film, porous polypropylene film and so on may be used.

The negative electrode 6 may be prepared by suspending a negative electrode active material and a binder in an appropriate solvent, followed by coating the suspension on the collector and drying thereof, and thereby forming in a sheet. For the negative electrode active material, carbonaceous materials, such as pyrocarbons, pitches and cokes, graphites, glassy carbons, roasted bodies of organic high-polymer compound, such as phenolic resin or furan resin, carbon fiber, active carbon or the like, or metallic lithium, lithium alloy, such as Li-Al alloy, polymer, such as polyacetylene or polypyrrole, all of which are capable of storing and releasing lithium ions, may be used. For the binder, the similar ones with the positive electrode 5 may be used.

Compounding ratios of the negative electrode active material and the binder are preferable to be in the range of from 90 to 95% by mass for the negative electrode active material and in the range of from 2 to 10% by mass for the binder. For the current collector on which the suspension, containing the negative electrode active material and the binder, is coated, followed by drying, for instance, foils of, for instance, such as copper, stainless steel and nickel, mesh, perforated metal, metal lath or the like may be used.

Furthermore, the nonaqueous electrolytic solution may be prepared by dissolving an electrolyte in a nonaqueous solvent. For the nonaqueous solvent, for instance, various kinds of nonaqueous solvents known as the solvent for the lithium ion secondary battery may be used. The nonaqueous solvent for the nonaqueous electrolytic solution is not particularly restricted, and, for instance, mixed solvents between propylene carbonate, ethylene carbonate and so on, and dimethyl carbonate, methyl ethyl carbonate, diethyl carbonate, γ-butyrolactone, 1,2-dimethoxyethane, 1,2-diethoxyethane, ethoxy-methoxy ethane or the like, may be used.

For the electrolyte, lithium salts, such as $LiPF_6$, $LiBF_4$, $LiClO_4$, $LiAsF_6$, and $LiCF_3O_3$, may be illustrated. A dissolving amount of such electrolytes to the nonaqueous solvent is preferable to be in the range of from 0.5 to 1.5 mol/L (liter).

According to the lithium ion secondary battery 12, in which the aforementioned present invention is applied, excellent battery capacity, charge-discharge characteristics, temperature characteristics (in particular low temperature characteristics) and so on may be obtained, based on the miniaturization of the particle size of the positive electrode active material, and, furthermore, the sharp particle size distribution. In addition, since the gas evolution in the battery may be suppressed as low as possible, the pressure rise in the battery due to the gas evolution may be inhibited from occurring. That is, safety and quality may be improved.

Next, specific embodiments of the present invention and evaluation results thereof will be explained.

Embodiment 1

First, cobalt oxide, lithium carbonate, and tin oxide are mixed with a predetermined mixing ratio, followed by sintering in air, at a temperature of 900° C., for 5 hr, thereby a composite oxide, the positive electrode active material, is formed. The composite oxide is analyzed by means of powder X-ray diffraction method with Cu—$K_\alpha$ line and found substantially identical with $LiCoO_2$.

The composition analysis of the obtained composite oxide is performed in the following ways, and the composition is confirmed to be $Li_{1.05}Co_1Sn_{0.0003}O_2$. Co is quantitatively analyzed by dissolving a sample with hydrochloric acid, followed by adding an EDTA solution, thereafter, by performing back titration with a zinc solution. Li and Sn are quantitatively analyzed by decomposing a sample with hydrochloric acid, followed by performing ICP measurement.

Furthermore, the average particle size (D(50) value) of the composite oxide (positive electrode active material) is 3.45 μm. In addition, the D(1) value is 0.5 μm, and the D(99) value is 11 μm. The particle size distribution and the individual D values based thereon are measured according to the aforementioned method. Specific measurement conditions are as follows. First, a sample of 0.5 g is stirred in 100 mL water, followed by ultrasonic dispersion under the conditions of 100 W and 3 min. The suspension is measured of the particle size distribution by means of MICROTRACK II PARTICLE-SIZE ANALYZER TYPE 7997-10 manufactured by LEEDS & NORTHRUP INSTRUMENTS, and, therefrom, the individual values of D(1), D(50), and D(99) are obtained.

Next, with the obtained composite oxide as the positive electrode active material, a positive electrode mixture is prepared by mixing 90% by mass of the positive electrode active material, 6% by mass of graphite as the conductive material, and 4% by mass of polyvinylidene fluoride as the binder. The positive electrode mixture is dispersed in N-methyl-2-pyrolydone to form a slurry, and the slurry is coated on an aluminum foil, followed by drying. The dried body is compression molded by means of a roller press. The obtained compression molded body is cut into a predetermined size, thereby a sheet-like positive electrode is obtained.

A mass of the positive electrode is measured, and by subtracting weights of the conductive material, binder and aluminum foil therefrom, 10 g is obtained as a mass of the used positive electrode active material. In the following Embodiments 2 through 18 and Comparative Examples 1 through 5 too, the mass of each of the positive electrode active materials is 10 g for all.

Next, 93% by mass of carbonaceous material and 7% by mass of polyvinylidene fluoride as the binder are mixed, thereby a negative electrode mixture is prepared. With the exception of use of the negative electrode mixture, a sheet-like negative electrode is prepared, similarly as the positive electrode.

The aforementioned sheet-like positive electrode, the separator, made of the porous polyethylene film, and the sheet-like negative electrode are laminated in this order, the laminated body is wound in whirlpool so that the negative electrode may be positioned outside, thereby an electrode group is prepared. A lead is attached to the electrode group, thereafter the electrode group with the lead is accommodated in a cylindrical battery case with bottom (battery canister). Furthermore, after the nonaqueous electrolytic solution is injected into the battery case, the battery case is sealed, thereby a cylindrical lithium ion secondary battery is assembled. The nonaqueous electrolytic solution is prepared by dissolving $LiPF_6$, at a concentration of 1 mol/L, in a mixed solvent of a 1:1 mixture of ethylene carbonate and methyl ethyl carbonate.

The low temperature characteristics and the pressure in the battery are measured and evaluated of thus manufactured cylindrical lithium ion secondary batteries, in the following ways. These measurements are shown in Table 1, and FIG. 2 and FIG. 3.

The low temperature characteristics are measured in the following ways. That is, under an environment of 20° C., with a current limit of 1 A, a constant voltage charge at 4.2 V is performed for 5 hr, after a pause of 1 hr, discharge at 1 A is performed to 2.7 V. Discharge capacity at this time is denoted as Cap(20). Then, after a pause of 1 hr, with a current limit of 1 A, a constant voltage charge at 4.2 V is performed for 5 hr, and after lowering the temperature to −20° C., discharge at 1 A is performed. The discharge capacity at this time is denoted as Cap(−20). A ratio between these capacities (Cap(−20)/Cap(20)) is taken as the capacity maintenance rate.

The pressure inside the battery is measured in the following ways. The batteries, which are used for measurement of the pressure inside the battery, are previously attached with a pressure gauge so that the pressure inside the battery case (canister) may be measured. Under an environment of 20° C., with a current limit of 1 A, a constant voltage charge at 4.2 V is performed for 5 hr, after leaving in an environment of 85° C. for 24 hr, followed by returning to the environment of 20° C., then the inside pressure, when the temperature of the battery becomes 20° C., is measured.

Embodiments 2 to 10

With the exception of changing, respectively, the mixing ratios of the individual starting raw materials of the positive electrode active materials, in the similar ways as Embodiment 1, the composite oxides, as the positive electrode active material, are composed, respectively. Each of the composite oxides is analyzed by means of powder X-ray diffraction method with Cu $K_\alpha$ line and is found to be substantially identical with $LiCoO_2$. Furthermore, the composition analysis and the particle size distribution measurement are performed of each of the obtained composite oxides, in the similar ways as Embodiment 1. These results are shown in Table 1.

Next, in the similar ways as Embodiment 1, the sheet-like positive electrodes are prepared, respectively. Furthermore, with these sheet-like positive electrodes, in the similar ways as Embodiment 1, the cylindrical lithium ion secondary batteries are assembled. The low temperature characteristics and the pressures inside the batteries of thus prepared cylindrical lithium ion secondary batteries are measured and evaluated in the similar ways as Embodiment 1. These measurements are shown in Table 1 and FIGS. 2 and 3.

COMPARATIVE EXAMPLES 1 to 5

With the exception of changing the mixing ratios of the individual starting raw materials of the positive electrode active materials, in the similar ways as Embodiment 1, the composite oxides, respectively, as the positive electrode active material, are composed. In each of the composite oxides, the content of Sn is out of the range of the present invention. The composition analysis and the particle size distribution measurement of the obtained composite oxides are performed, in the similar ways as Embodiment 1. These results are shown together in Table 1.

Next, in the similar ways as Embodiment 1, the sheet-like positive electrodes are prepared, respectively. Furthermore, with each of the sheet-like positive electrodes, in the similar ways as Embodiment 1, the cylindrical lithium ion secondary battery is assembled. The low temperature characteristics and the pressure inside the battery of each of thus prepared cylindrical lithium ion secondary batteries are measured and evaluated in the similar ways as Embodiment 1. These measurements are shown in Table 1 and FIGS. 2 and 3.

TABLE 1

| | Composition ($Li_xCo_ySn_zO_2$) | | | D(50) | D(1) | D(99) | Capacity Maintenance Rate | Battery Inside Pressure |
|---|---|---|---|---|---|---|---|---|
| | x | y | z | (μm) | (μm) | (μm) | Cap(−20)/Cap(20) | (× 10⁵ Pa) |
| E1 | 1.05 | 1 | 0.0003 | 3.45 | 0.5 | 11 | 42.5 | 1.18 |
| E2 | 1.05 | 1 | 0.0000003 | 9.61 | 0.2 | 48 | 20 | 0.94 |
| E3 | 1.05 | 1 | 0.000001 | 7.37 | 0.2 | 38 | 25 | 1.05 |
| E4 | 1.05 | 1 | 0.000003 | 6.21 | 0.3 | 32 | 27 | 1.04 |
| E5 | 1.05 | 1 | 0.00001 | 4.97 | 0.4 | 28 | 32 | 1.09 |
| E6 | 1.05 | 1 | 0.00003 | 4.43 | 0.4 | 24 | 40 | 1.10 |
| E7 | 1.05 | 1 | 0.0001 | 3.66 | 0.5 | 19 | 42 | 1.12 |
| E8 | 1.05 | 1 | 0.0007 | 3.56 | 0.5 | 14 | 43 | 1.19 |
| E9 | 1.02 | 1 | 0.0007 | 3.30 | 0.5 | 14 | 44 | 1.08 |
| E10 | 1.01 | 1 | 0.0005 | 3.40 | 0.5 | 16 | 41 | 0.88 |
| CE1 | 1.05 | 1 | 0 | 13.07 | 0.3 | 83 | 10 | 0.98 |
| CE2 | 1.05 | 1 | 0.002 | 3.44 | 0.4 | 13 | 43 | 2.08 |
| CE3 | 1.05 | 1 | 0.01 | 3.58 | 0.5 | 12 | 44 | 3.15 |
| CE4 | 1.05 | 1 | 0.05 | 3.42 | 0.4 | 12 | 44 | 4.43 |
| CE5 | 1.05 | 1 | 0.1 | 3.56 | 0.5 | 13 | 44 | 5.83 |

Figure 2:
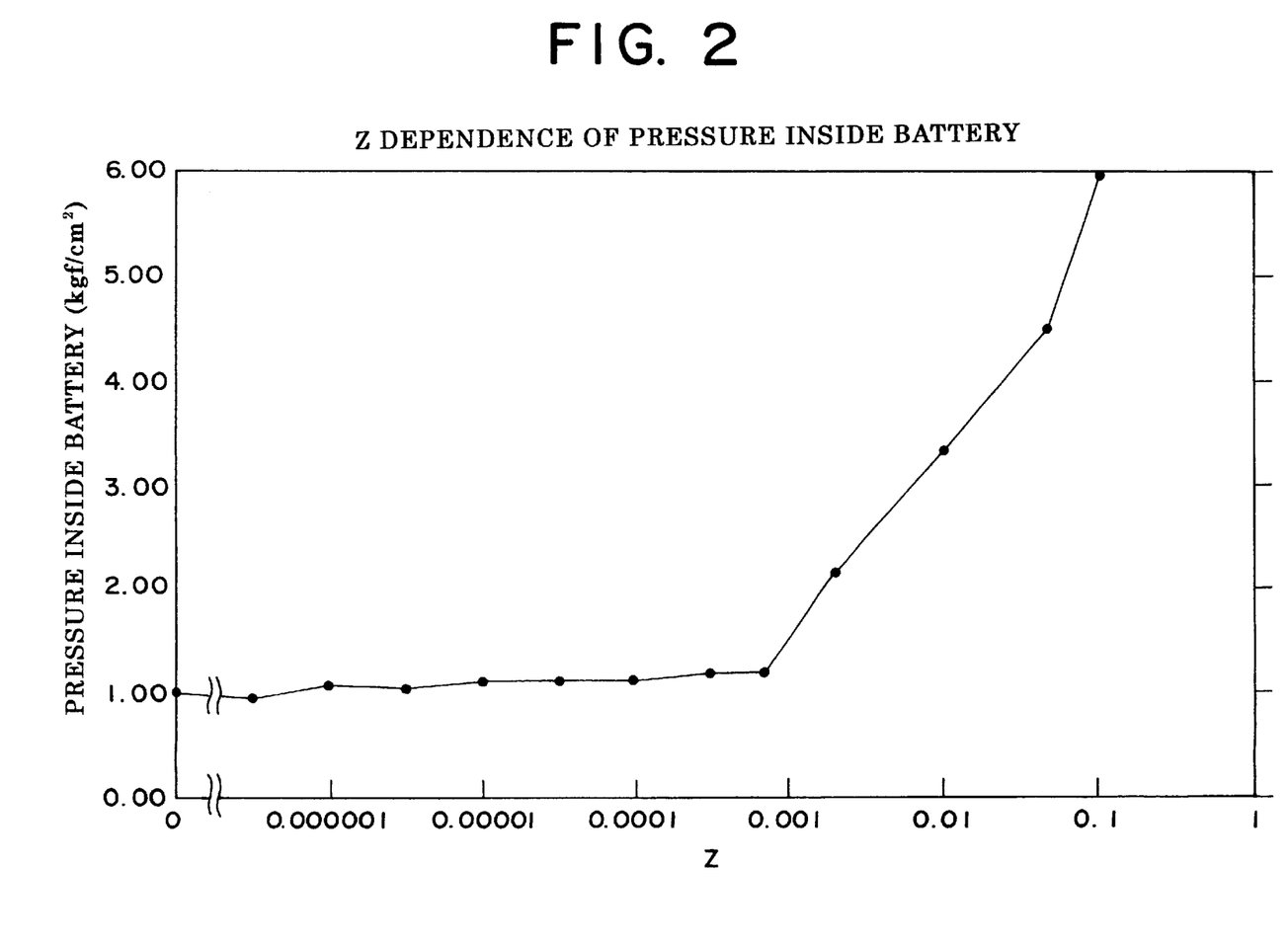
FIG. 2 is a diagram showing relationship between Sn content in the positive electrode active material and pressure inside the battery in the Li ion secondary battery.

E = Embodiment,
CE = Comparative Example,
D(50) = D(50) particle size,
(D1) = D(1) particle size,
D(99) = D(99) particle size It is obvious from Table 1 and FIG. 2 that, when a z value, which shows the content of Sn, becomes 0.001 or more, the pressure inside the battery becomes larger than atmospheric pressure. Since, when the pressure inside the battery becomes larger, though depending on the case, there may be a likelihood of destroying the battery, the pressure inside the battery is preferable to be smaller. Depending on material of the battery canister and a thickness of the canister, the pressure inside the battery is preferable to be $1.27 \times 10^5$ Pa or less. All of the individual lithium ion secondary batteries according to Embodiments 1 through 10 satisfy this condition.

Figure 3:
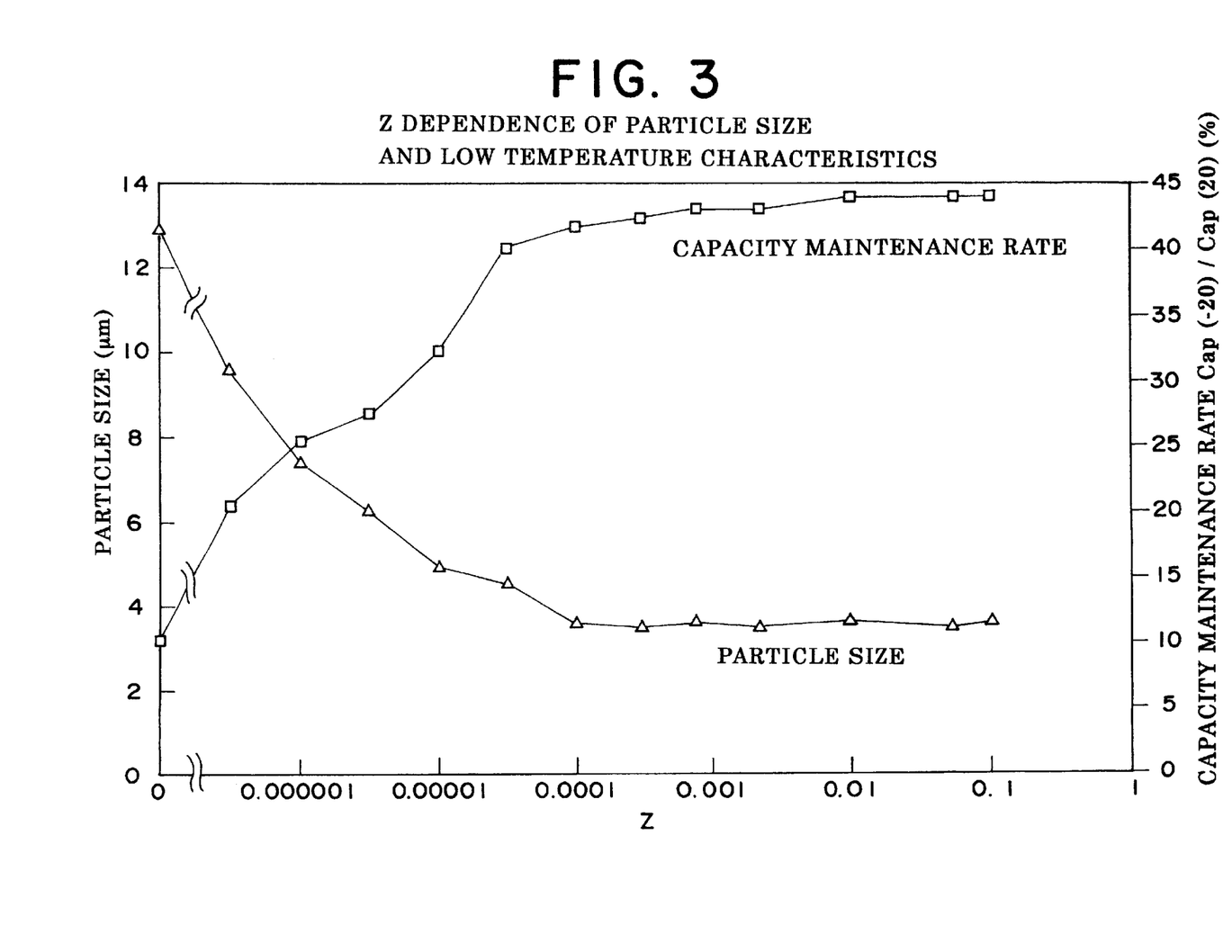
FIG. 3 is a diagram showing relationship between content of Sn in the positive electrode active material and particle size thereof and capacity maintenance rate of the Li ion secondary battery.

Furthermore, it is obvious from Table 1 and FIG. 3 that the positive electrode active material, in which Sn is contained less than 0.001 in terms of the z value, is smaller in the particle size and sharper in the particle size distribution, and, based thereon, the low temperature characteristics and so on of the lithium ion secondary battery are improved. It is obvious that, in view of satisfying both the pressure inside the battery and the low temperature characteristics of the secondary battery, the content of Sn is preferable to be in the range of $0.00001 \leq z < 0.001$, furthermore preferable to be in the range of $0.0001 \leq z < 0.001$.

tics and the pressure inside the battery of thus prepared cylindrical lithium ion secondary batteries are measured and evaluated in the similar ways as Embodiment 1. These measurements are shown together in Table 2.

TABLE 2

| | Composition ($Li_xM_ySn_zO_2$) | | | | D(50) ($\mu$m) | D(1) ($\mu$m) | D(99) ($\mu$m) | CMR Cap(−20)/Cap(20) | BIP (× 10⁵ Pa) |
|---|---|---|---|---|---|---|---|---|---|
| | M Element | x | y | z | | | | | |
| E11 | Co90Ni10 | 1.06 | 1 | 0.0003 | 3.6 | 0.5 | 17 | 45 | 1.18 |
| E12 | Co90Ni10 | 1.04 | 1 | 0.0001 | 4.0 | 0.4 | 22 | 40 | 1.08 |
| CE7 | Co90Ni10 | 1.04 | 1 | 0 | 10.4 | 0.4 | 91 | 7 | 0.95 |
| E13 | Co10Ni90 | 1.05 | 1 | 0.0003 | 3.5 | 0.5 | 18 | 44 | 1.08 |
| E14 | Co10Ni90 | 1.02 | 1 | 0.0001 | 4.0 | 0.4 | 24 | 41 | 0.98 |
| CE8 | Co10Ni90 | 1.03 | 1 | 0 | 11.5 | 0.4 | 105 | 12 | 0.96 |
| E15 | Co90Fe10 | 1.05 | 1 | 0.0002 | 3.8 | 0.4 | 19 | 40 | 1.08 |
| E16 | Co90Fe10 | 1.02 | 1 | 0.0001 | 4.5 | 0.4 | 30 | 31 | 0.98 |
| CE9 | Co90Fe10 | 1.04 | 1 | 0 | 9.8 | 0.5 | 87 | 11 | 0.90 |
| E17 | Ni | 1.07 | 1 | 0.0003 | 3.9 | 0.4 | 21 | 39 | 1.08 |
| E18 | Ni | 1.04 | 1 | 0.0001 | 4.5 | 0.4 | 35 | 28 | 0.98 |
| CE10 | Ni | 1.03 | 1 | 0 | 8.7 | 0.5 | 77 | 11 | 0.88 |

E = Embodiment,
CE = Comparative Example,
D(50) = D(50) particle size,
(D1) = D(1) particle size,
D(99) = D(99) particle size,
CMR = Capacity Maintenance Rate,
BIP = Battery Inside Pressure

COMPARATIVE EXAMPLE 6

The raw material mixture the same as Comparative Example 1 (not containing tin oxide) is sintered in air, at a temperature of 850° C., for 5 hr, thereby a composite oxide, the positive electrode active material, is composed. Though this composite oxide has a small average particle size such as substantially 3.5 $\mu$m, the cylindrical lithium ion secondary battery, which uses this as the positive electrode active material, is inferior in the discharge capacity and the low temperature characteristics, accordingly, is put into practical use with difficulty.

EMBODIMENTS 11 to 18, COMPARATIVE EXAMPLES 7 to 10

With the exception in that cobalt oxide, nickel oxide, iron oxide, lithium carbonate and tin oxide are appropriately used, and these are mixed with a predetermined ratio, followed by sintering at a temperature in the range of from 700 to 900° C., in the similar ways as Embodiment 1, composite oxides, as the positive electrode active material, are composed, respectively. The composition of the M element is as shown in Table 2. The composition analysis and the particle size distribution measurement of the obtained composite oxides are performed in the similar ways as Embodiment 1. These results are shown in Table 2. The positive electrode active materials of all Comparative Examples 7 through 10 do not contain Sn.

Next, in the similar ways as Embodiment 1, the sheet-like positive electrodes are prepared, respectively. Furthermore, with each of the sheet-like positive electrodes, in the similar ways as Embodiment 1, the cylindrical lithium ion secondary battery is assembled. The low temperature characteris- It is obvious from Table 2 that, even when Co—Ni, Co—Fe, or Ni is used as the M element, the particle size of the positive electrode active material may be rendered smaller and the particle size distribution may be also rendered shaper. Accordingly, on the basis of these, the low temperature characteristics of the lithium ion secondary battery may be improved.

Industrial Applicability

The positive electrode active material of the present invention for the nonaqueous electrolytic solution secondary battery is excellent in the particle size controllability (miniaturization and sharpening of the particle size distribution), and, furthermore, capable of suppressing the gas evolution due to gasification of the nonaqueous electrolytic solution. According to the nonaqueous electrolytic solution secondary battery of the present invention, which uses such positive electrode active material, in addition to the improvement of the battery characteristics, such as the charge-discharge cycle characteristics and the low temperature characteristics, the pressure rise in the battery or the like may be hindered.

What is claimed is:

1. A positive electrode active material for a nonaqueous electrolytic solution secondary battery, consisting essentially of a Li containing transition metal composite oxide having a composition, expressed by, General formula: $Li_xM_ySn_zO_2$ (wherein M denotes at least one kind of element selected from transition metal elements, and x, y and z, respectively, denote the numbers satisfying $0.9 \leq x \leq 1.15$, $0.85 \leq y \leq 1.00$, and $0 < z < 0.001$).

2. A positive electrode active material for a nonaqueous electrolytic solution secondary battery as set forth in claim 1:

wherein the M element is at least one kind selected from Co, Ni, Mn, Fe and V.

3. A positive electrode active material for a nonaqueous electrolytic solution secondary battery as set forth in claim 1:
wherein the M element comprises Co and at least one kind selected from Ni, Mn, Fe and V.

4. A positive electrode active material for a nonaqueous electrolytic solution secondary battery as set forth in claim 1:
wherein the M element is Co.

5. A positive electrode active material for a nonaqueous electrolytic solution secondary battery as set forth in claim 1:
wherein the value of z in the general formula satisfies $0.00001 \leq z < 0.001$.

6. A positive electrode active material for a nonaqueous electrolytic solution secondary battery as set forth in claim 1:
wherein the Li containing transition metal composite oxide has a D(50) value of 10 μm or less.

7. A positive electrode active material for a nonaqueous electrolytic solution secondary battery as set forth in claim 1:
wherein the Li containing transition metal composite oxide has a D(50) value in the range of 3 μm or more and 8 μm or less.

8. A positive electrode active material for a nonaqueous electrolytic solution secondary battery as set forth in claim 6:
wherein the Li containing transition metal composite oxide has a D(99) value of 50 μm or less.

9. A positive electrode active material for a nonaqueous electrolytic solution secondary battery as set forth in claim 6:
wherein the Li containing transition metal composite oxide has a D(1) value of 0.2 μm or more and a D(99) value of 50 μm or less.

10. A nonaqueous electrolytic solution secondary battery, comprising:
a positive electrode containing a positive electrode active material, consisting essentially of a Li containing transition metal composite oxide having a composition, expressed by, General formula: $Li_xM_ySn_zO_2$ (wherein M denotes at least one kind of element selected from transition metal elements, and x, y and z denote, respectively, the numbers satisfying $0.9 \leq x \leq 1.15$, $0.85 \leq y \leq 1.00$, and $0 < z < 0.001$);

a negative electrode disposed through a separator to face the positive electrode;

a battery case accommodating the positive electrode, the separator and the negative electrode; and a nonaqueous electrolytic solution filled in the battery case.

11. A nonaqueous electrolytic solution secondary battery as set forth in claim 10:
wherein the M element is at least one kind selected from Co, Ni, Mn, Fe and V.

12. A nonaqueous electrolytic solution secondary battery as set forth in claim 10:
wherein the value of z in the general formula satisfies $0.00001 \leq z < 0.001$.

13. A nonaqueous electrolytic solution secondary battery as set forth in claim 10:
wherein the positive electrode active material has a D(50) value of 10 μm or less.

14. A nonaqueous electrolytic solution secondary battery as set forth in claim 13:
wherein the positive electrode active material has a D(99) value of 50 μm or less.

15. A nonaqueous electrolytic solution secondary battery as set forth in claim 13:
wherein the positive electrode active material has a D(1) value of 0.2 μm or more and a D(99) value of 50 μm or less.

16. A nonaqueous electrolytic solution secondary battery as set forth in claim 10:
wherein the secondary battery is a lithium ion secondary battery.

* * * * *

UNITED STATES PATENT AND TRADEMARK OFFICE
CERTIFICATE OF CORRECTION

PATENT NO. : 6,686,093 B1
DATED : February 3, 2004
INVENTOR(S) : Sakai et al.

It is certified that error appears in the above-identified patent and that said Letters Patent is hereby corrected as shown below:

Column 1,
Line 19, "soon" should be "so on".
Line 23, it should read "may be used as a power source for various".
Line 33, "utilizes" should be "utilized".
Line 36, "heavy usage" should be "heavily used".
Life 45, "on" should be deleted.

Column 2,
Line 2, "preferable to be finer" should be "preferably finer".

Column 3,
Lines 31 and 34, should read "showing the relationship".

Column 4,
Line 16, "is configured" should moved to precede "as the nonaqueous".

Column 5,
Line 29, "0 $\mu$m" should be "20 $\mu$m".
Line 52, "side" should be deleted.

Column 7,
Line 15, "preferable to be" should be replaced by "preferably".

Column 11,
Line 2, "preferable to be" should be replaced by more "preferably".
Line 3, "furthermore preferable" should be replaced by "more preferably".

UNITED STATES PATENT AND TRADEMARK OFFICE
CERTIFICATE OF CORRECTION

PATENT NO. : 6,686,093 B1
DATED : February 3, 2004
INVENTOR(S) : Sakai et al.

It is certified that error appears in the above-identified patent and that said Letters Patent is hereby corrected as shown below:

Throughout the patent, "$\leq$" is mistakenly listed as "$\leqq$" due to typographical errors by the USPTO. These errors can be noted in the following areas: In the abstract, line 6; Col.1, paragraph 5, line 6-7; Col. 2, paragraph 5, line 8; Col 4, paragraph 4, line 10; Col. 4, paragraph 6, lines 8-9; Col. 4, paragraph 7, line 5; Col. 5, paragraph 1, line 6; Col.6, paragraph 5, lines 7-8; Col. 11, paragraph 1, lines 3-4; Col. 12, claim 1, line 8; Col. 13, claim 5, line 5; Col. 14, claim 10, lines 5-6; and Col. 14, claim 12, line 4.

Signed and Sealed this

Third Day of August, 2004

JON W. DUDAS
*Acting Director of the United States Patent and Trademark Office*